United States Patent
Bae et al.

(10) Patent No.: US 11,310,827 B2
(45) Date of Patent: Apr. 19, 2022

(54) METHOD FOR CARRYING OUT UPLINK TRANSMISSION IN WIRELESS COMMUNICATION SYSTEM AND DEVICE THEREFOR

(71) Applicant: LG Electronics Inc., Seoul (KR)

(72) Inventors: Duckhyun Bae, Seoul (KR); Yunjung Yi, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/926,180

(22) PCT Filed: Feb. 14, 2019

(86) PCT No.: PCT/KR2019/001832
§ 371 (c)(1),
(2) Date: Jul. 10, 2020

(87) PCT Pub. No.: WO2019/160360
PCT Pub. Date: Aug. 22, 2019

(65) Prior Publication Data
US 2020/0413436 A1    Dec. 31, 2020

Related U.S. Application Data

(63) Continuation of application No. PCT/KR2019/001832, filed on Feb. 14, 2019.
(Continued)

(51) Int. Cl.
*H04W 72/14*    (2009.01)
*H04W 72/12*    (2009.01)
*H04L 5/00*    (2006.01)

(52) U.S. Cl.
CPC .......... *H04W 72/14* (2013.01); *H04L 5/0048* (2013.01); *H04W 72/1268* (2013.01)

(58) Field of Classification Search
CPC combination set(s) only.
See application file for complete search history.

(56) References Cited

U.S. PATENT DOCUMENTS

2013/0279486 A1* 10/2013 Kato ................ H04W 74/0833
370/336
2013/0343358 A1* 12/2013 Kato ................ H04W 56/0045
370/336
(Continued)

FOREIGN PATENT DOCUMENTS

JP          2013507823         3/2013
WO      WO-2017191840 A1 * 11/2017 ........ H04W 56/0045

OTHER PUBLICATIONS

CATT, On multiplexing of data transmissions with different durations, R1-1800261, 3GPP TSG RAN WG1 Meeting AH 1801, Vancouver, Canada, Jan. 22-26, 2018, 4 pages.
(Continued)

*Primary Examiner* — Yee F Lam
(74) *Attorney, Agent, or Firm* — Fish & Richardson P.C.

(57) ABSTRACT

The present disclosure provides an operation method, associated with uplink (UL) transmission, of a terminal in a wireless communication system supporting dynamic resource sharing between an eMBB and a URLLC. More specifically, the method carried out by a terminal comprises receiving, from a base station, a UL grant for scheduling a UL transmission; receiving, from the base station, a control message including first information indicating the stopping of the UL transmission, and second information on a resource for which the UL transmission is to be stopped; and on the basis of the control message, determining whether a demodulation reference signal (DMRS) for the UL transmission is included in the resource for which the UL transmission is to be stopped.

18 Claims, 9 Drawing Sheets

Related U.S. Application Data

(60) Provisional application No. 62/630,320, filed on Feb. 14, 2018.

(56) References Cited

U.S. PATENT DOCUMENTS

| | | | | |
|---|---|---|---|---|
| 2014/0050205 | A1* | 2/2014 | Ahn | H04W 72/0413 370/336 |
| 2018/0035459 | A1 | 2/2018 | Islam et al. | |
| 2018/0049079 | A1* | 2/2018 | Ozturk | H04W 72/0453 |
| 2018/0198665 | A1* | 7/2018 | Guo | H04W 56/0055 |
| 2018/0270869 | A1* | 9/2018 | Tsai | H04W 76/27 |
| 2019/0045556 | A1* | 2/2019 | Bagheri | H04W 74/0858 |
| 2019/0053120 | A1* | 2/2019 | Park | H04W 76/27 |
| 2019/0124682 | A1* | 4/2019 | Takeda | H04W 74/0833 |
| 2019/0141737 | A1* | 5/2019 | Kim | H04W 72/0446 |
| 2019/0159135 | A1* | 5/2019 | MolavianJazi | H04W 52/362 |
| 2019/0191429 | A1* | 6/2019 | Stern-Berkowitz | H04W 72/085 |
| 2019/0230546 | A1* | 7/2019 | Takahashi | H04W 72/085 |
| 2019/0349061 | A1* | 11/2019 | Cirik | H04L 1/1896 |
| 2020/0178275 | A1* | 6/2020 | Shao | H04W 74/004 |
| 2021/0076409 | A1* | 3/2021 | Goto | H04L 1/1864 |

OTHER PUBLICATIONS

Fujitsu, On eMMB and URLL Multiplexing, R1-1719616, 3GPP TSG RAN WG1 Meeting #91, Reno, USA, Nov. 27-Dec. 1, 2017, 7 pages.

Intel Corporation, Multiplexing of UL transmissions with different data durations and latency requirements, R1-1710576, 3GPP TSG RAN WG1 NR Ad-Hoc#2, Qingdao, P.R. China 27th$^{-3}$o$^{th}$ Jun. 2017, 5 pages.

PCT International Search Report in International Appin. No. PCT/KR2019/001832, dated Feb. 14, 2019, 7 pages (with English translation).

Vivo, Multiplexing data with different transmission durations, R1-1800205, 3GPP TSG RAN WG1 Meeting AH 1801, Vancouver, Canada, Jan. 22-26, 2018, 6 pages.

Huawei, HiSilicon,"Remaining aspects on pre-emption indication for DL multiplexing of URLLC and eMBB," Rl-1719402, 3GPP TSG RAN WG1 Meeting #91, Reno, USA, Nov. 27-Dec. 1, 2017, 10 pages.

Korean Office Action in Korean Appln. No. 10-2020-7018953, dated Aug. 10, 2020, 10 pages (with English translation).

EP Extended European Search Report in European Appln. No. 19755200.3, dated Feb. 3, 2021, 12 pages.

LG Electronics, "Discussion on multiplexing of eMBB and URLLC for downlink," R1-1702488, 3GPP TSG RAN WG1 Meeting #88, Athens, Greece, dated Feb. 13-17, 2017, 7 pages.

LG Electronics, "Discussion on multiplexing of eMBB and URLLC," R1-1700512, 3GPP TSG RAN WG1 NR Ad-hoc Meeting, Spokane, USA, dated Jan. 16-20, 2017, 10 pages.

ZTE, "Uplink multiplexing for different transmission duration," R1-1707193, 3GPP TSG RAN WG1 Meeting #89, Hangzhou, P.R. China, dated May 15-19, 2017, 5 pages.

Office Action in Japanese Appln. No. 2020-541579, dated Aug. 31, 2021, 9 pages (with English translation).

* cited by examiner

METHOD FOR CARRYING OUT UPLINK TRANSMISSION IN WIRELESS COMMUNICATION SYSTEM AND DEVICE THEREFOR

CROSS-REFERENCE TO RELATED APPLICATIONS

Pursuant to 35 U.S.C. § 119(e), this application is a continuation of International Application No. PCT/KR2019/001832, filed on Feb. 14, 2019, which claims the benefit of U.S. Provisional Application No. 62/630,320 filed on Feb. 14, 2018, the contents of which are all hereby incorporated by reference herein in their entirety.

TECHNICAL FIELD

The present disclosure relates to a wireless communication system, and more particularly, to a method for carrying out uplink transmission and a device supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

SUMMARY

An embodiment of the present disclosure provides a method for sharing and using resources with each other in a dynamic or semi-static method by terminals using transmission resources having different time lengths.

Furthermore, an embodiment of the present disclosure provides a UL transmission handling method when a DMRS for UL transmission is included in a resource indicated by a pre-emption resource indication.

The technical objects of the present disclosure are not limited to the aforementioned technical objects, and other technical objects, which are not mentioned above, will be apparently appreciated by a person having ordinary skill in the art from the following description.

In an aspect, provided is an operation method, associated with uplink (UL) transmission, of a terminal in a wireless communication system supporting dynamic resource sharing between an eMBB and a URLLC, which includes: receiving, from a base station, a UL grant for scheduling of the uplink transmission; receiving, from the base station, a control message including first information indicating the stopping of the uplink transmission and second information on a resource for which the UL transmission is to be stopped; and determining whether a demodulation reference signal (DMRS) for the UL transmission is included in the resource for which the UL transmission is to be stopped based on the control message.

Furthermore, in the present disclosure, the method further includes when the resource for which the uplink transmission is to be stopped is included in the DMRS, dropping the uplink transmission in the resource for which the uplink transmission is to be stopped.

Furthermore, in the present disclosure, the method further includes when the resource for which the uplink transmission is to be stopped is included in the DMRS, receiving, from the base station, information on a new location of the DMRS.

Furthermore, in the present disclosure, a resource for the uplink transmission includes a first part corresponding to a resource positioned before the resource for which the uplink transmission is to be stopped, a second part corresponding to the resource for which the uplink transmission is to be stopped, and a third part corresponding to a resource behind the resource for which the uplink transmission is to be stopped.

Furthermore, in the present disclosure, the information on the new location of the DMRS is applied to each of the first part and the third part.

Furthermore, in the present disclosure, the resource for which the uplink transmission is to be stopped is scheduled in units of a non-slot having a smaller than one slot in a time domain.

Furthermore, in another aspect, provided is a terminal for carrying out uplink (UL) transmission in a wireless communication system supporting dynamic resource sharing between an eMBB and a URLLC, which includes: a transmitter for transmitting a radio signal; a receiver for receiving the radio signal; and a processor functionally connected to the transmitter and the receiver, in which the processor is configured to control the receiver so as to receive, from a base station, a UL grant for scheduling of the uplink transmission, control the receiver so as to receive, from the base station, a control message including first information indicating the stopping of the uplink transmission and second information on a resource for which the UL transmission is to be stopped, and determine whether a demodulation reference signal (DMRS) for the UL transmission is included in the resource for which the UL transmission is to be stopped based on the control message.

The present disclosure has an advantage in that in a next-generation wireless communication system, a terminal can use resources of other transmissions pre-allocated or being transmitted for transmitting urgent traffic.

Furthermore, the present disclosure has an advantage in that collision with existing transmission and performance degradation of the existing transmission can be minimized during such a process.

Effects obtainable in the present disclosure are not limited to the aforementioned effects and other unmentioned effects will be clearly understood by those skilled in the art from the following description.

DESCRIPTION OF DRAWINGS

The accompanying drawings, which are included as part of the detailed description in order to provide a thorough understanding of the present disclosure, provide embodiments of the present disclosure and together with the description, describe the technical features of the present disclosure.

DETAILED DESCRIPTION

Figure 1:
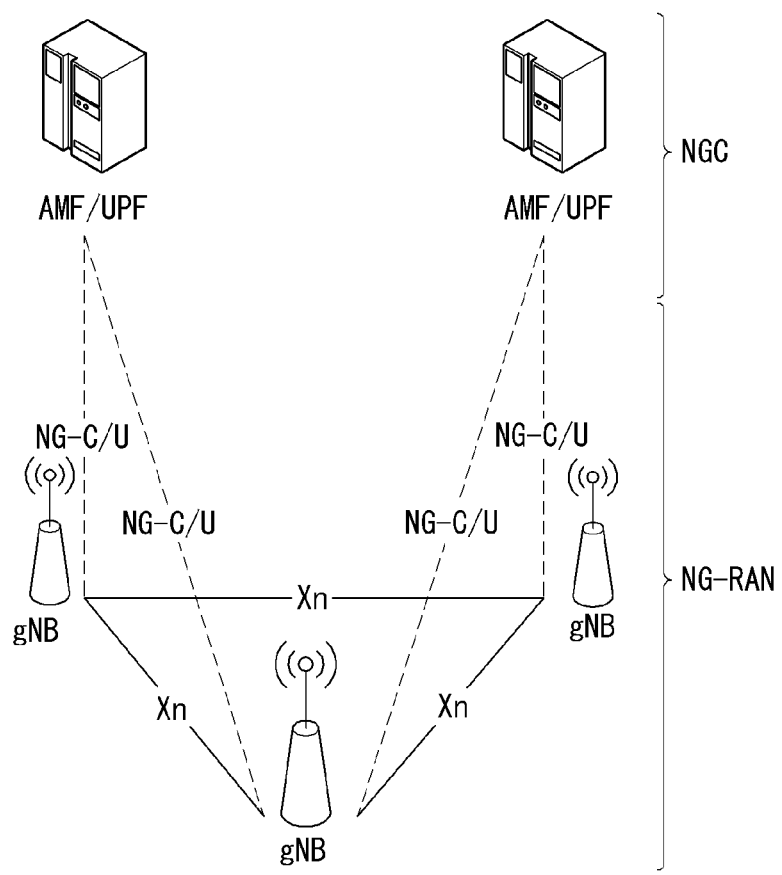
FIG. 1 is a diagram illustrating an example of an overall system structure of NR to which a method proposed in the present disclosure may be applied.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP), gNB (general NB, generation NB). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A/NR(New RAT) is chiefly described, but the technical characteristics of the present disclosure are not limited thereto.

As propagation of smart phones and Internet of things (IoT) terminals rapidly spreads, the amount of information which is transmitted and received through a communication network increases. Accordingly, the next generation wireless access technology is an environment (e.g., enhanced mobile broadband communication) that provides a faster service to more users than existing communication systems (or existing radio access technology) needs to be considered.

To this end, a design of a communication system that considers machine type communication (MTC) providing a service by connecting multiple devices and objects is being discussed. Further, a design of a communication system (e.g., Ultra-Reliable and Low Latency Communication (URLLC)) considering a service and/or a user equipment sensitive to reliability and/or latency of communication is also being discussed.

Hereinafter, in this specification, for easy description, the next-generation radio access technology is referred to as a new radio access technology (RAT) and the wireless communication system to which the NR is applied is referred to as an NR system.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 2:
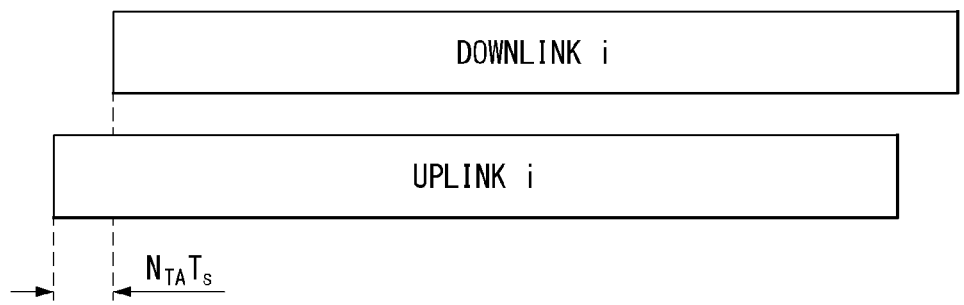
FIG. 2 illustrates a relationship between an uplink frame and a downlink frame in a wireless communication system to which a method proposed in the present disclosure may be applied.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology μ, slots are numbered in ascending order of $n_s^\mu \in \{0, \ldots, N_{subframe}^{slots, \mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols for each slot ($N_{symb}^{slot}$), the number of slots for each radio frame ($N_{slot}^{frame,\mu}$), and the number of slots for each subframes ($N_{slot}^{subframe,\alpha}$) in a normal CP and Table 3 shows the number of OFDM symbols for each slot, the number of slots for each radio frame, and the number of slots for each subframe in an extended CP.

TABLE 2

| μ | $N_{symb}^{slot}$ | $N_{slot}^{frame\mu}$ | $N_{slot}^{subframe\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

Figure 3:
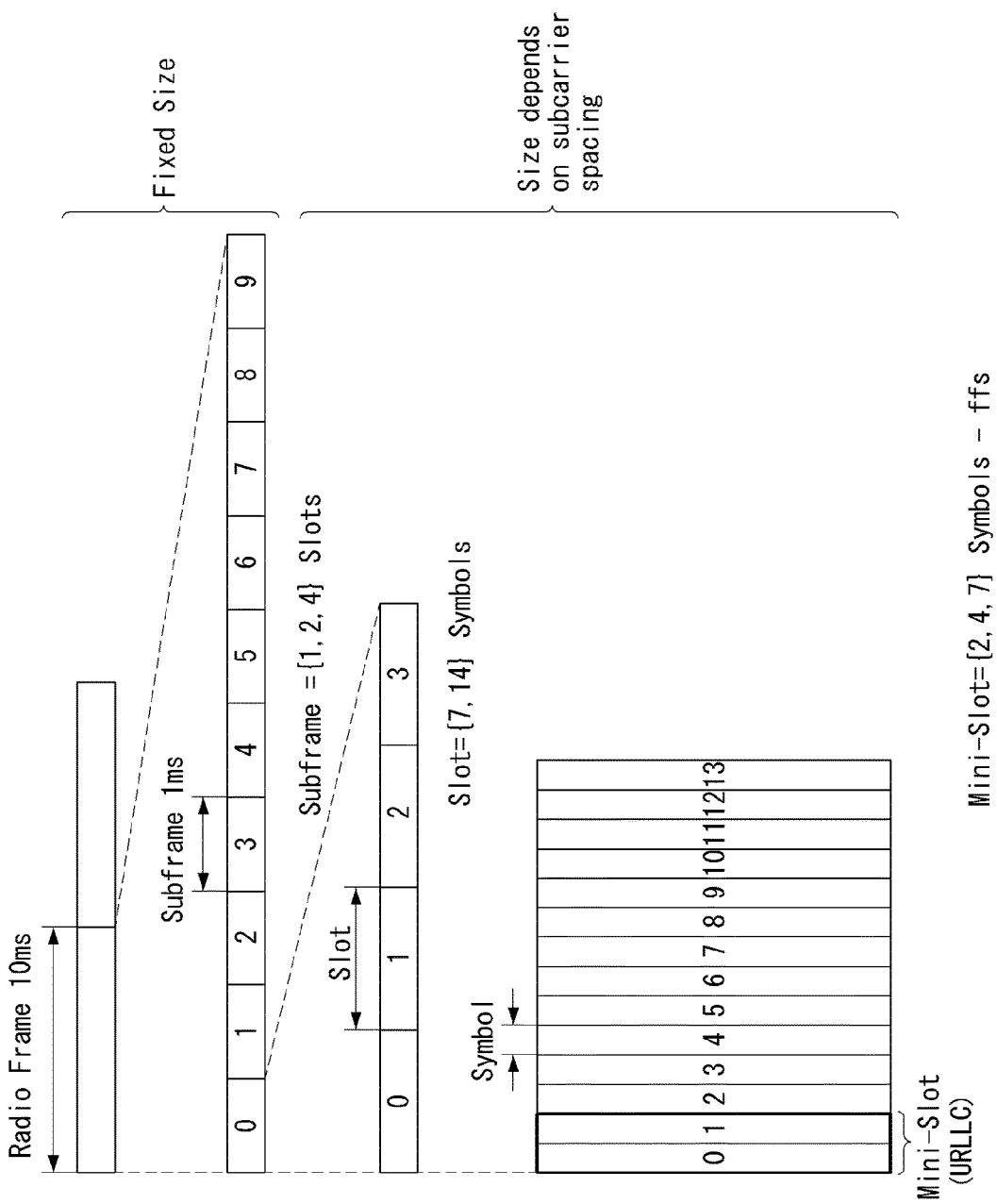
FIG. 3 illustrates an example of a frame structure in an NR system.

FIG. 3 illustrates an example of a frame structure in an NR system. FIG. 3 is just for convenience of the description and does not limit the scope of the present disclosure.

In the case of Table 3, as an example of a case where μ=2, i.e., a case where a subcarrier spacing (SCS) is 60 kHz, one subframe (or frame) may include four slots by referring to Table 2 and as an example, a case of one subframe={1, 2, 4} slots is illustrated in FIG. 3 and the number of slot(s) which may be included in one subframe may be defined as shown in Table 2.

Further, a mini-slot may be constituted by 2, 4, or 7 symbols and constituted by more or less symbols.

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 4:
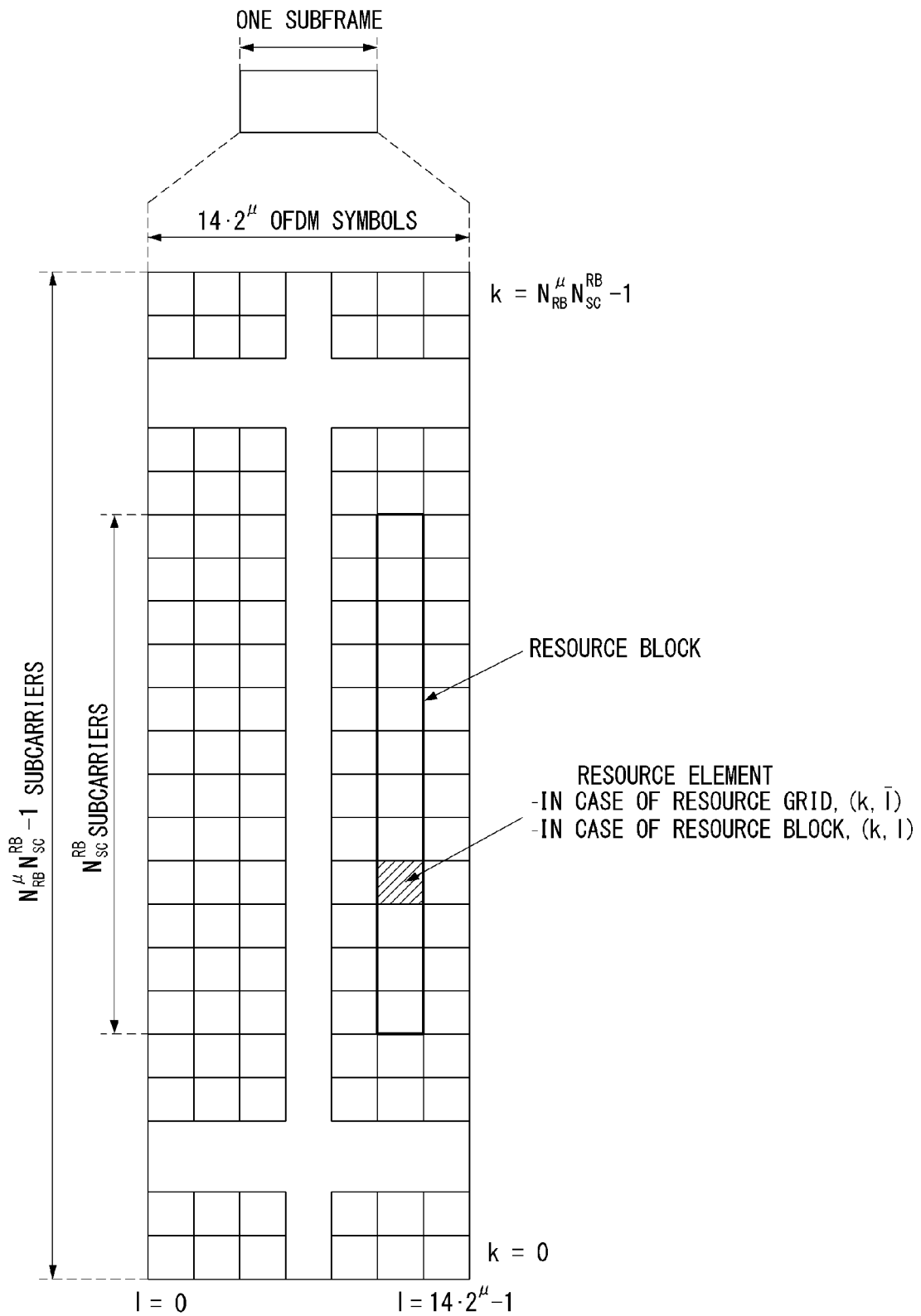
FIG. 4 illustrates an example of a resource grid supported by a wireless communication system to which a method proposed in the present disclosure may be applied.

FIG. 4 illustrates an example of a resource grid supported by a wireless communication system to which a method proposed in the present disclosure may be applied.

Referring to FIG. 4, it is exemplarily described that the resource grid is constituted by $N_{RB}^{\mu}N_{sc}^{RB}$ subcarriers on the frequency domain and one subframe is constituted by 14·2$^{\mu}$ OFDM symbols, but are not limited thereto.

In the NR system, a transmitted signal is described by one or more resource grids constituted by $N_{RB}^{\mu}N_{sc}^{RB}$ subcarriers and $2^{\mu}N_{symb}^{(\mu)}$ OFDM symbols. Here, $N_{RB}^{\mu} \leq N_{RB}^{max,\mu}$. The $N_{RB}^{max,\mu}$ represents a maximum transmission bandwidth and this may vary even between uplink and downlink in addition to numerologies.

Figure 5:
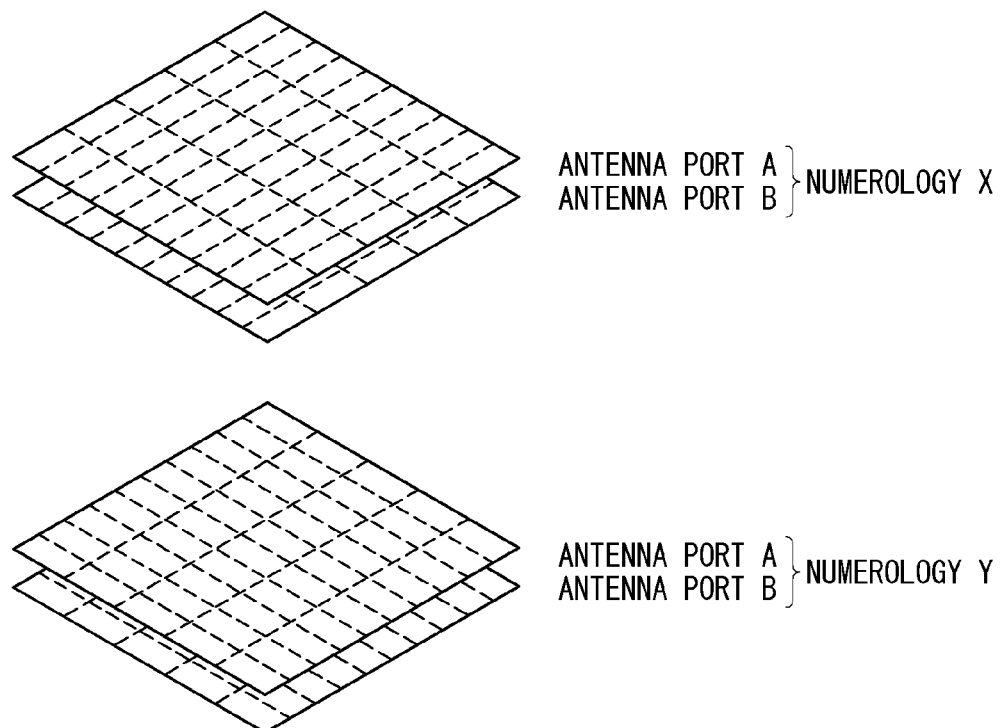
FIG. 5 illustrates examples of a resource grid for each antenna port and numerology to which a method proposed in the present disclosure may be applied.

In this case, as illustrated in FIG. 5, one resource grid may be configured for each numerology μ and each antenna port p.

FIG. 5 illustrates examples of a resource grid for each antenna port and numerology to which a method proposed in the present disclosure may be applied.

Each element of the resource grid for the numerology μ and the antenna port p is referred to as a resource element and uniquely identified by an index pair (k,l). Here, k=0, ..., $N_{RB}^{\mu}N_{sc}^{RB}-1$ represents an index on the frequency domain and l=0, ..., $2^{\mu}N_{symb}^{(\mu)}-1$ represents a position of the symbol in the subframe. The index pair (k,l) is used when representing the resource element in the slot. Here, l=0, ..., $N_{symb}^{\mu}-1$.

The resource element (k,l) for the numerology μ and the antenna port p corresponds to a complex value $a_{k,l}^{(p,\mu)}$. When there is no risk of confusion or when a specific antenna port or numerology is not specified, the indexes p and μ may be dropped, and as a result, the complex value may become $a_{k,l}^{(p)}$ or $a_{k,l}$.

Further, a physical resource block is defined by $N_{sc}^{RB}=12$ consecutive subcarriers on the frequency domain.

Point A may serve as a common reference point of a resource block grid and may be acquired as follows.

OffsetToPointA for PCell downlink indicates the frequency offset between the lowest subcarrier of the lowest resource block superposed with the SS/PBCH block used by the UE for initial cell selection and point A, and is expressed by resource block units assuming a 15 kHz subcarrier spacing for FR1 and a 60 kHz subcarrier spacing for FR2; and absoluteFrequencyPointA indicates the frequency-position of point A expressed as in an absolute radio-frequency channel number (ARFCN).

Common resource blocks are numbered upward from 0 in the frequency domain for subcarrier interval setting μ.

The center of subcarrier 0 of common resource block 0 for the subcarrier interval setting μ coincides with 'point A'. A common resource block number $n_{CRB}^{\mu}$ and the resource element (k,l) for the subcarrier interval setting μ in the frequency domain may be given as in Equation 1 below.

$$n_{CRB}^{\mu} = \lfloor \frac{k}{N_{sc}^{RB}} \rfloor \qquad \text{Equation 1}$$

Here, k may be defined relatively to point A so as to correspond to a subcarrier in which k=0 is centered on point A. The physical resource blocks are numbered from 0 to $N_{BWP,i}^{size}-1$ in a bandwidth part (BWP) and i represents the number of BWP. A relationship between the physical resource block $n_{PRB}$ and the common resource block $n_{CRB}$ in BWP i may be given by Equation 2 below.

$$n_{CRB}=n_{PRB}+N_{BWP,i}^{start} \qquad \text{Equation 2}$$

Here, $N_{BWP,i}^{start}$ may be a common resource block in which the BWP starts relatively to common resource block 0.

Self-Contained Structure

A time division duplexing (TDD) structure considered in the NR system is a structure in which both uplink (UL) and downlink (DL) are processed in one slot (or subframe). This is to minimize the latency of data transmission in the TDD system and the structure may be referred to as a self-contained structure or a self-contained slot.

Figure 6:
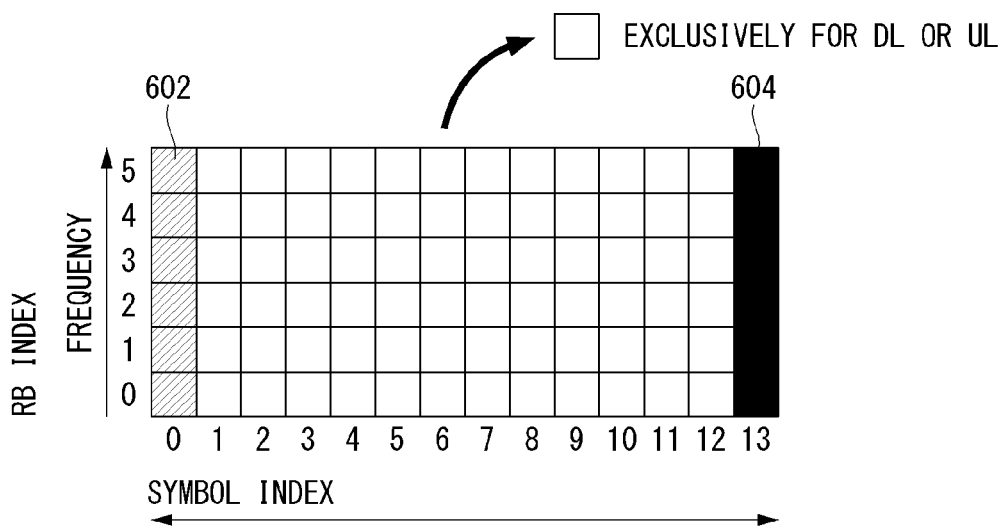
FIG. 6 illustrates one example of a self-contained structure to which a method proposed in the present disclosure may be applied.

FIG. 6 illustrates one example of a self-contained structure to which a method proposed in the present disclosure may be applied. FIG. 5 is just for convenience of the description and does not limit the scope of the present disclosure.

Referring to FIG. 6, it is assumed that one transmission unit (e.g., slot or subframe) is constituted by 14 orthogonal frequency division multiplexing (OFDM) symbols as in legacy LTE.

In FIG. 6, a region 602 refers to a downlink control region and a region 604 refers to an uplink control region. Further, regions (that is, regions without a separate indication) other than the regions 602 and 604 may be used for transmitting downlink data or uplink data.

That is, uplink control information and downlink control information may be transmitted in one self-contained slot. On the contrary, in the case of data, the uplink data or downlink data may be transmitted in one self-contained slot.

When the structure illustrated in FIG. 6 is used, in one self-contained slot, downlink transmission and uplink transmission may sequentially proceed and transmission of the downlink data and reception of uplink ACK/NACK may be performed.

Consequently, when an error of data transmission occurs, a time required for retransmitting data may be reduced. Therefore, latency associated with data transfer may be minimized.

In the self-contained slot structure illustrated in FIG. 6, a time gap for a process of switching from a transmission mode to a reception mode of a base station (eNodeB, eNB, or gNB) and/or a terminal (user equipment (UE)) or a process of switching from the reception mode to the transmission mode is required. In association with the time gap, when the uplink transmission is performed after the downlink transmission in the self-contained slot, some OFDM symbol(s) may be configured as a guard period (GP).

Analog Beamforming

In a millimeter wave (mmWave, mmW) communication system, as the wavelength of the signal becomes shorter, multiple (or multiplex) antennas may be installed in the same area. For example, in a 30 CHz band, the wavelength is approximately 1 cm, and when antennas are installed at an interval of 0.5 lambda in a panel of 5 cm×5 cm according to a two-dimensional arrangement form, a total of 100 antenna elements may be installed.

Accordingly, in the mmW communication system, a method for increasing coverage or increasing the throughput by increasing a beamforming (BF) gain using multiple antenna elements or increasing a throughput may be considered.

In this case, when a transceiver unit (TXRU) is installed so as to adjust transmission power or a phase for each antenna element, independent beamforming is possible for each frequency resource.

However, a method for installing the TXRU in all antenna elements (e.g., 100 antenna elements) may be ineffective in terms of cost. As a result, a method for mapping multiple antenna elements to one TXRU and controlling a direction of a beam by using an analog phase shifter may be considered.

The aforementioned analog beamforming method may generate only one beam direction in all bands, so that a frequency selective beam operation may not be performed.

As a result, hybrid beamforming with B TXRUs that are fewer than Q antenna elements, as an intermediate form of digital beamforming and analog beamforming, may be considered. In this case, although there is a difference depending on a connection method of B TXRUs and Q antenna elements, the number of directions of the beams that may be transmitted at the same time is limited to B or less.

Halting on-going transmission of eMBB

When the transmission of the eMBB UL channel and the transmission of the UL channel of the URLLC are superposed with each other, the detection performance of the two UL channels may drop rapidly due to mutual interference.

Particularly, in the case of URLLC, a substantial latency may be increased due to failure of detection of the UL channel.

As part of a method for preventing the above problems, the UE may consider stopping transmission of the eMBB UL channel being transmitted only at a time when the URLLC UL channel is transmitted or after that time including the corresponding time.

For the method, the eMBB UE needs to recognize the existence of the URLLC UL channel during transmission.

Two following methods (method 1 and method 2) are more specific examples for a method for recognizing the existence of a URLLC UL channel and performing halting by the eMBB UE.

Method 1

The eMBB UE may consider detecting the UL grant for the URLLC and/or the DMRS for the control channel and/or the DMRS for the UL channel.

The expression of 'A and/or B' used in the present disclosure may be construed as the same meaning as 'including at least one of A and B'.

For Method 1, the gNB needs to signal information required for detecting a URLLC signal to the eMBB UE or to be UE-group-specific.

More specifically, the information required for the detection may be candidates for DCI or and/or DMRS.

As another method, the DCI and/or DMRS for the URLLC may be configured to be cell-specific, beam-specific, or group-common instead of being configured to be UE-specific.

Method 1 may be not appropriate when the numerologies of the eMBB and the URLLC are different from each other.

In this case, a halting signal may be transmitted according to the eMBB numerology.

The eMBB UE may detect the halting signal from the gNB and half the eMBB transmission only at the corresponding time or from the time after a predetermined time.

It may be difficult to perform Method 1 when the URLLC is grant-free UL transmission (or configured grant defined in NR).

Accordingly, a resource for the grant-free UL transmission may be reserved (so as to be prevented from being used as eMBB UL).

Method 2

The eMBB UE may use a listen before talk (LBT) method for the URLLC signal.

In other words, whether to transmit the URLLC signal is measured (by energy detection, etc.) during the eMBB UL transmission to halt the eMBB UL transmission based thereon.

However, Method 2 may not be normally performed when a distance between two UEs increases (hidden-node problem).

In general, a UE that receives multi-slot scheduling or multi-mini-slot scheduling may define a control channel monitoring behaviour of the UE as follows.

(1) When control channel monitoring is configured for each slot, the control channel monitoring is performed.

Here, an indication of suspension, drop, or continuation for the mini-slot scheduling which is currently ongoing may be designated by control.

The content or type may be notified by differently using Radio Network Temporary Identifier (RNTI), differently using cyclic redundancy check (CRC), differentiating scrambling, or differently using DM-RS sequence/scrambling.

Alternatively, the content or type may be distinguished by differentiating a transmission search space candidate or resource.

(2) In the case of the multi-slot scheduling, the control channel monitoring may be skipped in the middle of transmission/reception.

The indication signal for stopping puncturing or on-going UL transmission, which is transmitted to the UE by the gNB may be transmitted for each mini-slot (group) (separately indicated through the higher layer signaling) or for each URLLC transmission time interval (TTI).

For example, when the eMBB and the URLLC having different service requirements and/or scheduling units operate based on the grant of the gNB, the gNB may transmit, to the eMBB UE, the indication signal in order to receive the URLLC UL transmission (through some superposed time-frequency resources) during occurrence of the eMBB UL transmission.

A transmittable time of the indication signal may be a time of transmitting the grant for the URLLC UL transmission or between a time after the corresponding time and a time before the URLLC UL transmission time.

The eMBB UE may be in transmission latency or transmission halting of the eMBB UL transmission from a specific time (e.g., next mini-slot (group)) from the time of receiving (or detecting) the indication signal transmitted by the gNB.

More specifically, the indication signal may be extensively applied even to DL transmission in addition to UL transmission for eMBB/URLLC.

The next-generation system may use some resources as URLLC DL transmission while the eMBB DL transmission is in progress for the eMBB and the URLLC having different service requirements and/or scheduling units.

The may consider introduction of the indication signaling for the situation for appropriate demodulation and decoding.

Similarly, when the gNB transmits the indication signal for each mini-slot (group), the indication signal may include (1) whether the ongoing eMBB DL transmission is punctured by the URLLC DL transmission or corresponding resource information and/or (2) whether the on-going eMBB UL transmission is delayed or halted by the URLLC UL transmission or corresponding target resource information.

As yet another expression method, the indication signal may include (1) a display of a part other than information on the corresponding UE in demodulating or decoding DL data and/or (2) whether to delay transmission or halt transmission from a specific time in transmitting UL data.

The information may be briefly configured in the form of a bitmap of 2 bits, and MSB may be information on DL and LSB may be information on UL.

Alternatively, the indication signal may be configured in a form of mapping information on the eMBB/URLLC DL and/or UL multiplexing to different sequences.

When grant-free based UL transmission is considered, it may be inefficient for the gNB to adjust a method for ongoing transmission.

For example, when it is assumed that the URLLC uses the grant-free UL transmission method and traffic intermittently occurs, the gNB may not know when to stop the eMBB UL transmission.

As a method for alleviating the problem, it may be considered that a resource which is a target of the transmission delay or transmission halting is configured in advance (through the high layer signaling).

Superposition of eMBB and URLLC

As yet another method, it may be considered that the eMBB and the URLLC are simultaneously transmitted in the same resource.

By increasing a power ratio between two UL channels to a predetermined level or more and superposing two UL channels, the gNB may distinguish and detect two UL channels (by using an interference cancellation technique, etc.).

Basically, the eMBB UL transmission may be in progress and further, when QAM modulation is considered, it is advantageous in that power of one channel is maintained during transmission, and as a result, it may be considered that the power of the URLLC is appropriately changed.

Depending on a situation or power setting of the eMBB UE, it may be considered that a URLLC signal is overlapped (or superposed) with an eMBB UL signal or conversely, it may be considered that an eMBB signal is overlapped with a URLLC UL signal.

The signal which is overlapped in superposition may have relatively small power and the signal to be overlapped may need to be first detected.

In other words, in terms of latency, the network may allow only overlapping the eMBB signal (of relatively small transmission or reception power) with the URLLC UL signal (of relatively large transmission or reception power).

In the above case, in order to decode the eMBB signal, the URLLC signal should be able to be removed in whole or at a predetermined level and to this end, the information on the URLLC signal needs to be notified to the corresponding eMBB UE to be cell-common or group-common.

The method may be limited to the eMBB DL transmission and since a target subjected to UL transmission may be the same network, the method may be a case where decoding information for both the eMBB and URLLC UL transmissions is known.

As a more specific example, a candidate(s) for information capable of decoding the URLLC signal may be defined in advance or indicated through signaling by the network.

In the above description, network signaling may be configured in a higher layer or a candidate group may be configured in the higher layer and then indicated in DCI.

More specifically, the DCI may be group-common DCI or DCI for scheduling corresponding eMBB data.

The URLLC signal has relatively large power, and as a result, the URLLC signal may be decoded regardless of presence or absence of the eMBB signal.

If the superposition in the opposite direction is considered, description positions of the eMBB signal and the URLLC signal may be changed in the embodiment.

More specifically, at the time of providing the information on the eMBB signal to the URLLC UE, the gNB may provide information on a specific CB group together.

Basically, grant based scheduling may be considered for the eMBB UL channel and both grant based scheduling and grant-free based scheduling may be considered for the URLLC UL channel.

In the above description, the grant-free based scheduling may be a form in which the UE autonomously transmits the channel in a resource allocated in advance or in the higher layer without a scheduling indication of the gNB.

Superposition may be individually configured through power control (in particular, transmit power control (TPC)) between grant based UL channel transmissions.

As an example, the TPC and/or high layer signaled offset may be set to an appropriate value.

However, an adjustment width for a range of a corresponding value may need to be large, and as a result, when a superposition operation (in the higher layer) is configured, the value range of the TPC and/or a value or a value range of an higher layer signaled offset may fluctuate.

A case where resources which may be transmitted with superposition of the eMBB and the URLLC are configured to be semi-static and URLLC scheduling in the corresponding resource is made dynamically based on the grant may be considered.

In this case, the eMBB UE may apply a separate transmission power in a resource in which the URLLC may be transmitted or a resource in which the URLLC may not be transmitted and separate TPC information applied to the resource in which the URLLC may be transmitted may be received through the higher layer signaling.

It may also be considered that all different resources in which power setting may be different are configured for single UL transmission.

As an example, in a guaranteed resource considering the superposition or for the URLLC transmission, the UL transmit power may be set to be relatively smaller than that in other resources.

When the UL transmit power is changed, phase continuity may not be guaranteed.

Accordingly, a separate pilot or RS may be added even to the guaranteed resource.

Next, a UE operation in the guaranteed resource will be described in more detail through the following methods. In particular, a transmission method of the eMBB UL transmission will be described.

Method 1

Method 1 is to prevent transmission except for all or specific signals (e.g., RS and/or UCI).

That is, for URLLC transmission, eMBB UL transmission may be punctured or rate-matched in a corresponding resource.

The punctured or rate-matched may be expressed as dropped.

Method 2

In Method 2, transmission power may be configured to be small except for all or specific signals (e.g., RS and/or UCI).

More specifically, the transmission power or power density for the corresponding guaranteed resource may be configured (additionally offset) in proportion to the transmission power in a non-guaranteed resource or the power control may be separately and independently performed (independently subjected to higher layer signaled offset setting and/or transmit power control (TPC) operation).

Method 3

Method 3 is to apply an orthogonal cover code (OCC) to the frequency and/or time domain.

For example, in the eMBB UL transmission, the OCC may be applied to a frequency axis within a specific PRB set (e.g., single PRB) (e.g., 2-length OCC or 4-length OCC) and multiplexing between the eMBB and the URLLC having different service requirements and/or scheduling units may be supported based on the applied OCC.

More specifically, the eMBB UL transmission may be repeatedly mapped to an even subcarrier index and an odd subcarrier index for each physical resource block (PRB) and the OCC may be configured for each index (a coded symbol corresponding to the even subcarrier index may be multiplied by +1 and a coded symbol corresponding to the odd subcarrier index may be multiplied by −1 or +1 according to the service or UE).

Alternatively, in each PRB, the eMBB UL transmission may be repeatedly mapped to first six subcarrier indexes and subsequent six subcarrier indexes and the OCC may be configured for each index.

Method 3 may be selected only in a mutually specific scheme or indicated (e.g., indicated by the DCI or configured through the higher layer signaling) by the gNB.

The DCI may correspond to scheduling of the corresponding UL transmission.

Further, the URLLC to be multiplexed may not be limited to the grant based UL transmission and may be extensively applied even to the grant-free based UL transmission.

On the contrary, since power adjustment in the gNB may be limited, the grant-free based UL channel may not support superposition with the eMBB data.

In the above case, the eMBB data may be rate-matched or punctured for the resource configured for the grant-free URLLC.

The resource configured for the URLLC may be configured as all candidates in which the grant-free UL transmission may be transmitted or separately indicated (indicated by the higher layer signaling or DCI) in the form of the guaranteed resource by the gNB.

As still yet another method, when the superposition is supported, the resource may be configured depending on the higher layer signaled offset and more specifically, the TPC for the grant-free may be transmitted through a separate channel (e.g., group-common DCI or UE-specific DCI).

Specifically, the corresponding TPC command may be setting of power for a first grant-free resource after the TPC command rather than an accumulation purpose.

Alternatively, powers for multiple grant-free resources may be configured through the TPC command and how many resources the power is applied to may be configured through the higher layer or indicated dynamically.

The value transmitted in the TPC may be an offset or a power control parameter corresponding to P0 or alpha.

In addition, the UE may calculate the power by configuring the corresponding parameter based on measured pathloss.

When the URLLC and the eMBB are superposed with each other, the eMBB UE may empty the RE and perform the rate matching without transmitting the signal in an RE in which the DMRS of the URLLC may be transmitted.

Alternatively, the eMBB UE may transmit a sequence (e.g., RS) orthogonal to the URLLC DMRS in the RE in which the DMRS of the URLLC is transmitted.

This is to stably perform channel estimation of the URLLC even when the superposition occurs. When the gNB first decodes the URLLC and then decodes the eMBB, the URLLC may transmit the signal to the RE in which the DMRS of the eMBB is transmitted.

The reason is that when the URLLC successfully decodes the eMBB signal, decoding the eMBB signal may be attempted after removing the URLLC signal and reliability of the URLLC is generally higher than that of the eMBB.

A UL grant of an eMBB UE or URLLC UE is allowed to be detected by the URLLC UE or a grant-free using UE.

The gNB may perform masking with a group RNTI rather than perform masking with the RNTI for each UE and transmit a UE ID to a payload.

Alternatively, when a two-stage DCI is used, the gNB may first transmit an indication for resource allocation to the UE with the group RNTI in the case of a $1^{st}$ level DCI and the gNB may transmit the indication to the UE with the UE RNTI in the case of a $2^{nd}$ level DCI.

When during the grant-free transmission, the UE that receives the DCI senses that the grant-free transmission conflicts with the grant-based transmission and drops the UL transmission or performs the UL transmission, the UE may perform an operation of increasing the reliability by significantly increasing the power offset.

Further, in order to conflict with the grant-based UE, the gNB may dynamically change the frequency domain of the grant-free resource.

As an example, a system bandwidth may be divided into M sub-bands and the gNB may dynamically notify to the UE which sub-band the grant-free resource may come.

It may be considered that the collision may occur even between the grant-free UL transmissions and the OCC is to be applied at the time of mapping the UL channel to a reserved resource for all or some grant-free UL transmissions.

More specifically, a process of repeatedly applying the OCC to the grant-free UL transmission transmitted in the guaranteed resource at the time of mapping the corresponding coded symbol may be performed.

As an example, when OCCs o0, o1, o2, . . . , oM−1 are used for subcarrier indexes f0, f1, . . . , fN−1, coded symbols c0, c1, c2, . . . may be mapped in a scheme such as c0*o0, c0*o1, . . . , c0*oM−1, c1*o0, . . . , c1*oM−1, . . . in the guaranteed resource.

The OCC application method may be just an example and an actual mapping order may be interleaved.

An OCC sequence may be selected differently for different UEs and the grant-free UL transmissions for UEs using different OCCs may be separated and distinguished in the gNB.

In general, the amount of traffic of the URLLC may be relatively smaller than that of another data traffic, and as a result, an increase in resource depending on OCC application may be slight.

Pre-Emption Indication

In the NR, dynamic resource sharing between the eMBB and the URLLC is supported. eMBB and URLLC services may be scheduled on non-overlapping time/frequency resources and URLLC transmission may occur in resources scheduled ongoing eMBB traffic. The eMBB UE may not know whether PDSCH transmission of the corresponding UE is partially punctured and the UE may not decode the PDSCH due to corrupted coded bits. To this end, in the NR, pre-emption indication related contents are defined. The pre-emption indication may be referred to as an interrupted transmission indication.

Figure 7:
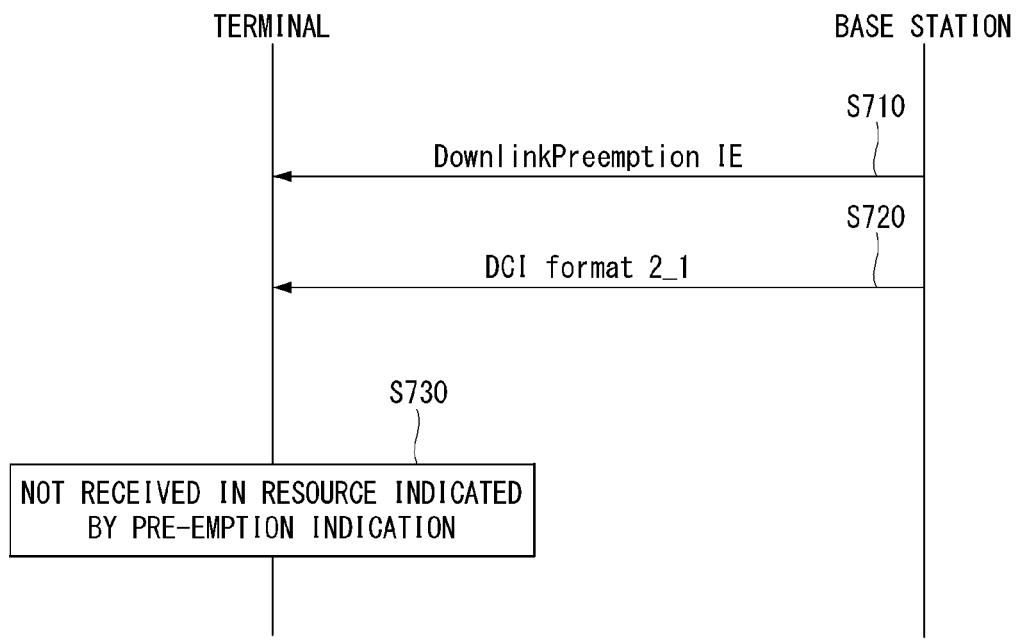
FIG. 7 is a flowchart illustrating an example of a pre-emption indication related operation.

FIG. 7 is a flowchart illustrating an example of a pre-emption indication related operation.

First, the UE receives DownlinkPreemption IE from the gNB (S710).

In addition, the UE receives DCI format 2_1 from the gNB based on the DownlinkPreemption IE (S720).

In addition, the UE does not perform reception of the signal in resources (PRB and OFDM symbol) indicated by the pre-emption indication included in the DCI format 2_1 (or assumes that no transmission is intended) (S730).

Figure 8:
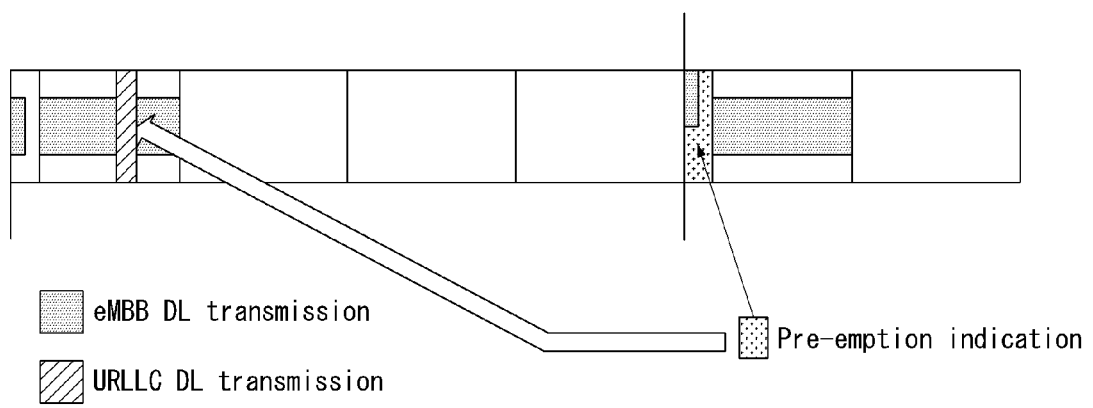
FIG. 8 is a diagram illustrating an example of a pre-emption indication method.

FIG. 8 is a diagram illustrating an example of a pre-emption indication method.

A pre-emption indication (or interrupted transmission indication or impacted resource indication) will be described in more detail.

When the UE receives higher layer parameter DownlinkPreemption, the UE is configured as INT-RNTI provided by higher layer parameter int-RNTI for monitoring PDCCH for carrying the DCI format 2_1.

In addition, in the UE, information such as INT-ConfigurationPerServingCell parameter, dci-PayloadSize parameter, and timeFrequencySet parameter is additionally configured by DownlinkPreemption IE.

Table 3 below shows an example of DownlinkPreemption IE.

TABLE 3

```
-- ASN1START
-- TAG-DOWNLINKPREEMPTION-START
DownlinkPreemption ::=              SEQUENCE {
    int-RNTI                          RNTI-Value,
    timeFrequencySet                  ENUMERATED {set0, set1},
    dci-PayloadSize                   INTEGER (0..maxINT-DCI-PayloadSize),
        int-ConfigurationPerServingCell         SEQUENCE (SIZE (1..maxNrofServingCells)) OF INT-ConfigurationPerServingCell,
        ...
}
INT-ConfigurationPerServingCell ::= SEQUENCE {
    servingCellId                     ServCellIndex,
    positionInDCI                     INTEGER (0..maxINT-DCI-PayloadSize-1)
}
-- TAG-DOWNLINKPREEMPTION-STOP
-- ASN1STOP
```

The int-RNTI parameter is RNTI used for the pre-emption indication in DL and a timeFrequencySet parameter is a parameter for selecting a set for a DL-preemption indication.

The parameter is a parameter representing a total length of a DCI payload scrambled to the INT-RNTI and the int-ConfigurationPerServingCell parameter is a parameter indicating positions of 14 bit INT values (for each serving) in the DCI payload.

The positionInDCI parameter is a parameter representing a start position of the 14 bit INT value applicable to the corresponding serving cell (servingCellId) in the DCI payload.

The INT-ConfigurationPerServingCell parameter is a parameter representing a serving cell index set provided by a set corresponding to positions for fields of DCI format 2_1 by corresponding higher layer parameter servingCellId and higher layer parameter positionInDCI.

When the UE detects the DCI format 2_1 for the serving cell from a set of configured serving cells, the UE may assume that there is no transmission to the corresponding UE in PRBs and symbols indicated by the DCI format 2_1 from a PRB set and a symbol set during a last monitoring period.

The DCI format 2_1 is used for notifying PRB(s) and OFDM symbol(s) which the UE assumes not to intend any transmission for the UE and the corresponding PRB and OFDM symbol are indicated by the pre-emption indication.

At least one pre-emption transmitted by the DCI format 2_1 is CRC-scrambled by an interruption radio network temporary identifier (INT-RNTI).

The size of the DCI format 2_1 is set up to 126 bits by the higher layers and each pre-emption indication is 14 bits.

Here, the pre-emption indication by the DCI format 2_1 is not applied to reception of an SS/PBCH block.

In the next-generation wireless communication system, the gNB may allocate the time/frequency resource to the UE more flexibly than in the legacy system and allocate individual bandwidth parts (BWP) to the UE without limiting the frequency domain of the UE to the system bandwidth.

Further, signaling allocated with the resource may also vary depending on services having different quality of service (QoS) used by the UEs.

In spite of another UE or one UE, the system should be able to prioritize the traffic of a specific service by considering requirements between the services.

The gNB needs to control the resources of the UEs more dynamically than the legacy system for a service requiring short latency and high reliability.

Compared with the legacy system, 5G/NR should be able to simultaneously support various services and one UE should also be able to simultaneously support various services.

In this case, when the quality of service (QoS) for various services is classified only at a level of L2 or higher, the QoS may not be appropriate for a service requiring very short latency. In order to support the service requiring the very short latency, a different operation should be able to be performed according to the QoS even in L1.

This may mean that a scheme in which the UE may distinguish a QoS requirement of each packet is required even in L1. By performing such an operation, data in which various QoS requirements are low may be supported and urgent data may be processed with short interruption and a minimum resource.

The next-generation wireless communication system may use the pre-emption indication using the group-common DCI for dynamic resource sharing of downlink transmission.

This is a method in which the gNB may arbitrarily transmit specific transmission by puncturing another transmission and may allow the UE to autonomously compensate damage due to puncturing by notifying to the UE whether to puncture anther transmission or a possibility of puncturing afterwards.

However, in the case of the uplink transmission, since a main subject of the transmission is a different UE, an additional consideration may be required in performing puncturing like downlink at the transmission time.

To this end, uplink dynamic sharing through an additional signaling or transmission technique such as a halting message, superposition transmission, etc., for a victim UE is considered.

The present disclosure provides a method for presenting a problem which may occur when using an additional signaling or transmission method in order for the UEs to use dynamic uplink sharing and a solving method therefor. The uplink resource sharing is more important than the downlink resource sharing. First, in the case of downlink, the network may give a priority to the URLLC traffic by a scheme of increasing the power or increasing the number of used resources. However, in the case of uplink, the corresponding operation may be limited due to limited power of the UE and in particular, it may be difficult to avoid interference caused by a UE which accesses another cell. Accordingly, schemes for effectively performing uplink multiplexing may be very important. Further, in a general URLLC use case, there are cases in which uplink traffic is more important (e.g., sensor data report). Accordingly, schemes for effectively performing URLLC UL transmission may be very important.

In the case of the present disclosure, multiplexing for the PUSCH transmission of the UE is handled, but it is apparent that contents of the present disclosure may be applied to PUSCH transmission using a configured grant in addition to dynamic grant PUSCH transmission generally used by the UE, PUCCH transmission by semi-static/dynamic signaling, or transmission used in the wireless communication system by a UE including the PDSCH in addition to uplink transmission during a random access in overall.

In the next-generation wireless system, a reference time unit assumed/used in transmitting/receiving the physical channel may be diversified according to an application field or the type of traffic.

The reference time may be a basic unit that schedules a specific physical channel and the reference time unit may vary depending on the number of symbols constituting the corresponding scheduling unit and/or the subcarrier spacing.

An embodiment of the present disclosure will be described based on a slot and a non-slot as the reference time unit for convenience of description. As an example, the slot may be a basic scheduling unit used in general data traffic (e.g., enhanced mobile broadband (eMBB)) and the non-slot may have a smaller time interval than the slot in the time domain.

The non-slot may be a basic scheduling unit used in a traffic or communication scheme (e.g., Ultra reliable and low latency communication (URLLC) or unlicensed band or millimeter wave) for a more special purpose.

This is just an embodiment and even when the eMBB transmits/receives the physical channel based on the non-slot or the URLLC or another communication technique transmits/receives the physical channel based on the slot, it is apparent that extension is made from the spirit of the present disclosure.

Impacted Resource Indication Handling Having TA

As described above, a method for stopping or puncturing existing transmission of a predetermined UE through separate signaling and urgently transmitting new transmission in a secured resource is being considered.

The signaling may be performed through downlink transmission in view of one UE.

At this time, it is important whether the UE is capable of processing the corresponding signaling in a short time.

When the gNB initiatively performs such signaling and resource allocation, in the ideal situation, the resource is pre-allocated, and a Halting request message received by the victim UE (vUE) that may not use the resource through any signaling, that is, an impacted resource indication and the uplink resource allocation and UL grant received by a pre-empting UE (pUE) which is to preferentially use the corresponding resource may be simultaneously received.

In this case, in order to prevent the vUE from interfering with transmission of the pUE, a time for which the vUE analyzes a halting message should be at least equal to or longer than a processing time for which the pUE analyzes the UL grant.

Figure 9:
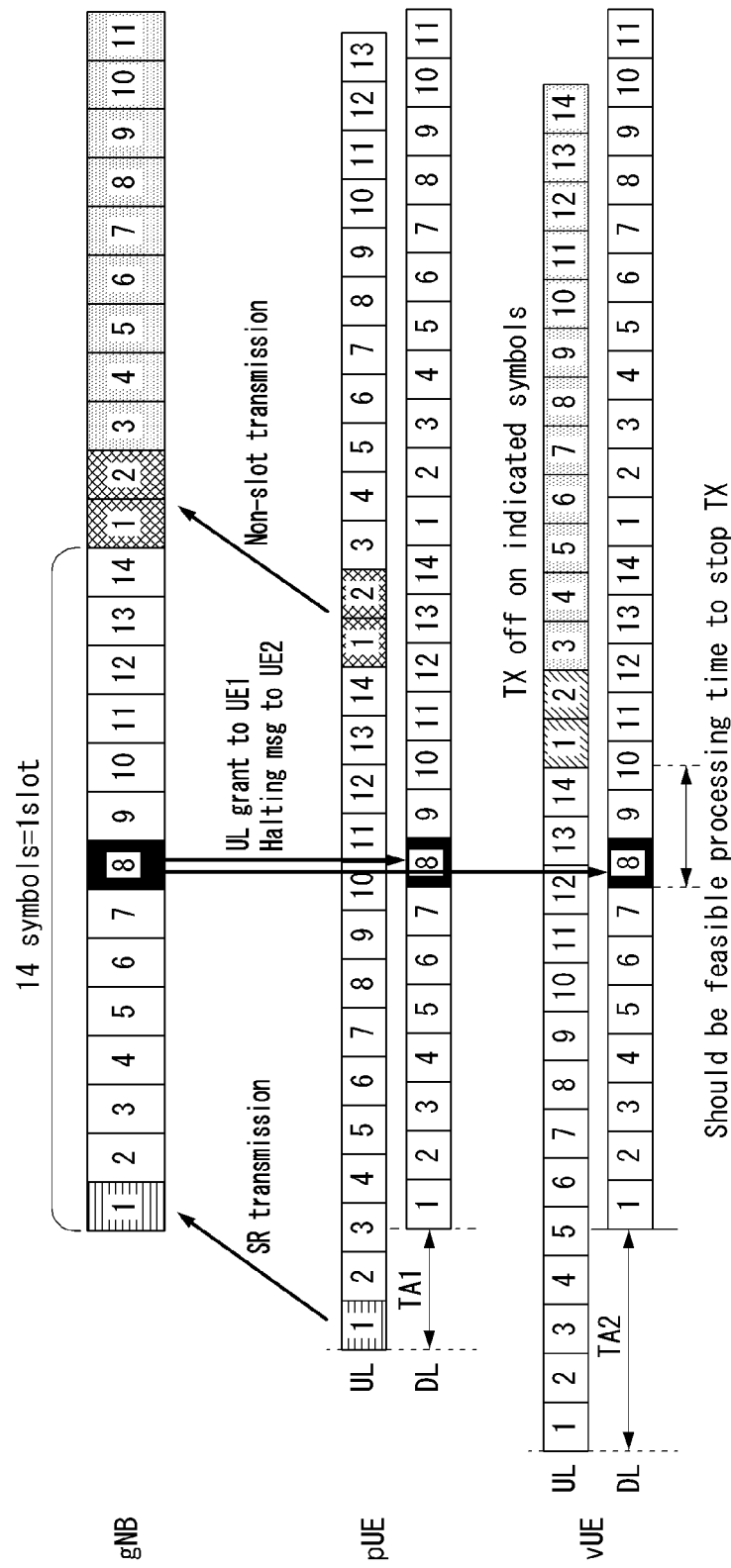
FIG. 9 is a diagram illustrating an example of a method for transmitting a halting message proposed in the present disclosure.

FIG. 9 illustrates an example thereof. In other words, FIG. 9 is a diagram illustrating an example of a method for transmitting a halting message proposed in the present disclosure.

The pUE is in a state of transmitting a scheduling request in $1^{st}$ symbol of slot n in order to use an urgent service and the vUE is in a state in which symbols of the n+1 slot are already allocated for use in PUSCH transmission.

In this case, the gNB may newly allocate, to the pUE, some of time/frequency resources are already allocated by the vUE as the UL grant in the $8^{th}$ symbol and simultaneously transmit, to the vUE, a halting message including information on the allocated resources.

In this case, the vUE needs to halt transmission in the $1^{st}$ and $2^{nd}$ symbols of the n+1 slot by analyzing the halting message received in the $8^{th}$ symbol of the n slot.

This may be the ideal situation and a receiving timing of the signaling may vary depending on a physical configuration of the channel (i.e., PDCCH) for transferring the signaling.

In addition, when the UE is located at a distance from the gNB, the uplink transmission is performed earlier by timing advanced (TA) by considering a propagation delay, and as a result, an available processing time which the vUE may use for analyzing the halting message may be changed by the various factors.

Accordingly, when a time of receiving the halting message is t and a position of a first resource pre-empted through the halting message is t+k, it may be considered that the UE or the gNB uses the halting message by considering the following so that the halting message transmitted by the gNB is valid.

In this case, the k may be predetermined or determined by higher layer signaling or L1 signaling.

Method 1

The vUE may determine the validity of the halting message by considering a TA value used thereby.

For example, when the TA is $t_{TA}$, if the value of $k-t_{TA}$ is less than a predetermined threshold $t_{threshold}$, the vUE may determine that the halting message is invalid.

The threshold may be a predetermined value or a value determined by higher layer signaling or L1 signaling of the gNB, or a value determined according to the capability of the UE.

The UE may not expect or ignore an invalid halting message.

When the UE does not expect or ignores the invalid halting message, the halting message may be transmitted through UE-specific signaling.

The method may be similarly applied even to a case where the UE a slot format indicator (SFI) and cancels transmission for UL.

When a slot in which the UE receives the SFI is n (slot #n), if a minimum processing time (to PUSCH) of the UE is k2 and when the TA value of the UE is $t_{TA}$, UL after at least $k2+2*t_{TA}$ from slot n may be cancelled.

More simply, the UE may cancel UL scheduled to slots after the delay or may cancel the UL only when a resource start of the UL is after the delay.

Method 2

The vUE may arbitrarily differently analyze the halting message by considering the TV value used thereby.

For example, when the TA is $t_{TA}$, if the value of $k-t_{TA}$ is less than a predetermined threshold $t_{threshold}$, k1 which satisfies $t_{threshold}$ $k1-t_{TA}$ may be used instead of predetermined k.

In this case, when a duration of the transferred pre-empted resource is d, $d_1$ of $d+k=k_1+d_1$ may be used as the duration.

In other words, the gNB may apply the halting message in the transferred pre-empted resource as possible.

The threshold may be a predetermined value or a value determined by higher layer signaling or L1 signaling of the gNB, or a value determined according to the capability of the UE.

In the methods, it is apparent that the technical spirit proposed in the present disclosure is extended even based on $t_{TA}$ instead of $k-t_{TA}$ in the process of determining or analyzing the validity of the halting message based on $k-t_{TA}$ by the UE.

Impacted resource indication handling having DMRS

In determining the validity of the halting message, the UE may consider both the position of the impacted resource indicated by the halting message and the DMRS location of the allocated PUSCH. In the uplink transmission, since the DMRS plays an important role in estimating the uplink channel of the UE by the gNB, in the absence of the DMRS, the transmission performance of the UE may be adversely affected. In addition, if the scheduled PUSCH resource is divided into two or more non-contiguous parts (in time) by the pre-empted resources, the phase continuity of the UE may not be established, so it may be important that the DMRS is included in each part for channel estimation of each part or a part that may not be received is dropped. In this case, the following methods may be considered.

Method 2-1

Even though the pre-empted resource indicated by the halting message transmitted to the vUE includes the DMRS symbol of the PUSCH transmission allocated by the UE, the pre-emption may not be applied to the DMRS symbol.

In other words, the DMRS symbol may be protected from the halting message. In this case, the UL grant of pUE may include information on the DMRS symbol of the vUE or indicate the same DMRS symbol.

Method 2-2

Even though the pre-empted resource indicated by the halting message transmitted to the vUE includes the DMRS symbol of the PUSCH transmission allocated by the UE, the vUE may drop the entire allocated PUSCH/PUCCH transmission.

This may be extended to an option of dropping the entire PUSCH/PUCCH when even a part of PUSCH is pre-empted even if the DMRS is not included in the pre-empted resource.

Method 2-3

Even though the pre-empted resource indicated by the halting message transmitted to the vUE includes the DMRS symbol of the PUSCH transmission allocated by the UE, the vUE may not expect or ignore the halting message.

In other words, the vUE may determine that the halting message is invalid.

Method 2-4

A new PUSCH DMRS may be indicated in the halting message transmitted to the vUE.

The new PUSCH DMRS may be a DMRS that is not included in the pre-empted resource.

In this case, the halting message transmitted to the vUE may indicate positions of a plurality of new PUSCH DMRSs.

The positions of the plurality of PUSCH DMRSs may be applied to parts of PUSCH having discontinuity due to the pre-empted resource, respectively.

Method 2-5

When the PUSCH allocated by the vUE has discontinuity due to the pre-empted resource, the DMRS may be transmitted in a specific symbol (e.g., the first symbol) of the entirety or part of the PUSCH.

Alternatively, an additional parameter for the DMRS transmission may be indicated in the halting message.

In particular, when the pre-empted resource is generated during the PUSCH transmission, the vUE may transmit the DMRS immediately after the corresponding pre-emption.

Method 2-6

When the PUSCH allocated by the vUE has discontinuity due to the pre-empted resource, only the entire or partial PUSCH having the DMRS may be transmitted and a PUSCH part not including the DMRS may not be transmitted.

Method 2-7

In the case of overlapped PUSCH even if the pre-empted resource does not conflict with the DMRS, a drop is assumed. Alternatively, the vUE performs transmission only from the first symbol to a first overlapped symbol.

When discontinuity occurs due to the above pre-emption resource, the technical reason that the above methods are required is that when puncturing occurs between the DMRS and the PUSCH, the UE may not perform alignment between the DMRS and the PUSCH while turning the antenna on/off.

The above methods may be applied only in the case of the discontinuity or a case where a time length of the pre-empted resource is larger than a predetermined time length k.

The k may be predetermined or determined by higher layer signaling or L1 signaling of the gNB, or may be one of the capabilities of the UE.

Further, when determining a new DMRS position in using the above methods or newly indicating through signaling, other data (e.g., UL-SCH data) other than the DMRS is already mapped to a resource element at a new DMRS position, corresponding DATA may be additionally punctured or rate-matched by a new DMRS.

Alternatively, if only the position of the DMRS is simply changed to a symbol level, the existing RE mapping may be transmitted while being changed in a position thereof.

Impacted Resource Indication Handling Having Waveform

When an impacted resource indication (i.e., pre-empted resource indication) received by the UE has information on the resource in the frequency domain, not only time-domain discontinuity but also frequency domain discontinuity may occur in the resource allocated by the UE.

In this case, when the UE uses a waveform sensitive to continuity of the frequency domain, such as DFT-s-OFDM, the transmission performance of the UE may be significantly degraded and the effect of the pre-emption may also be reduced.

Therefore, when the impacted resource indication (IRI) received by the vUE makes frequency-domain discontinuity, the following methods may be considered.

Method 3-1

The UE may ignore or not expect the IRI that makes frequency-domain discontinuity.

Alternatively, the IRI may be allowed only in CP-OFDM.

Method 3-2

When the UE receives the IRI that makes frequency-domain discontinuity, puncturing or rate matching may be performed in order to empty the entire frequency domain in a resource region in which frequency-domain discontinuity occurs.

In other words, the UE may apply only time-domain information in the information included in the IRI and assume that there is no information on the frequency domain or that the information continuously means the entire frequency domain.

In the operation, a different method may be used according to the waveform used by the vUE.

As an example, a UE using CP-OFDM may use information transmitted by the IRI as it is and a UE using DFT-s-OFDM may use the aforementioned method.

Design of Impacted Resource Indication

In the above operations, a method is required, in which the pre-empted resource is dynamically notified to the vUE in order for the vUE to secure resources to be used by the pUE.

In this case, the following methods may be considered for the design of signaling.

Method 4-1

In Method 4-1, a signaling such as a DL pre-emption indication may be reused.

In this case, the UL pre-emption indication has the same type of signaling, but other reference resources may be used.

More specifically, the time/frequency resource existing in the future may be used as the reference resource.

Method 4-2

Method 4-2 relates to reusing signaling of the UL grant.

More specifically, it may be indicated that the resource is pre-empted through specific parameter values in DCI format 0_0 and DCI format 0_1.

In this case, the existing time/frequency resource allocation may be used to indicate the pre-empted resource, and whether pre-emption is performed may be indicated by a separate field, or only the time-domain resource allocation may be used to indicate the position of the pre-empted resource, and whether pre-emption is performed may be indicated by using a specific value of the frequency resource allocation, e.g., '0' for all in RA type 0 and '1' for all in RA type 1.

In this case, the UE may ignore DCI fields not associated with a pre-emption operation or associated with a HARQ entity such as HARQ ID and NDI included in the corresponding DCI.

Impacted Resource Indication Handling Having SS/UE-ID

In order to promote efficient use of resources, it may be considered that the IRI is transmitted to multiple UEs at once like not only UE-specific signaling but also group-specific, BWP-specific, and cell-specific transmission. In this case, it may be difficult to exclude that the pUE receives the IRI. Therefore, a method for determining whether the UE is the pUE or the vUE when receiving the IRI is needed. In this case, the following methods may be used by considering parameters, resources, etc., used when the UE receives a control signaling.

Method 5-1

When the UE receives the IRI, the UE may determine whether the UE is the pUE or the vUE by considering whether there is a scheduled resource included in the pre-empted resource. In other words, it may be determined whether the UE is the pUE or the vUE by considering whether the pre-empted resource indicated by the IRI and the existing allocated scheduled resource are overlapped with each other.

In this case, the gNB may continuously transmit the IRI at a time equal to or earlier than the UL grant of the pUE so as to prevent the gNB from being confused and when the IRI and the UL grant received simultaneously with the IRI conflict with each other, the UL grant may be prioritized.

Method 5-2

When the UE receives the IRI, the UE may determine whether the UE is the pUE or the vUE by the scheduled signal of the scheduled resource included in the pre-empted resource. In this case, the following methods may be additionally considered.

Method 5-2-1

The UE may determine whether the UE is the pUE or the vUE based on a control channel (e.g., Search space, CORESET, PDCCH) used when being scheduled with the resource from the gNB.

For example, the UE may assume that scheduling included in corresponding CORESET is not pre-empted by another UE through a parameter included in a CORESET configuration. Alternatively, the position and the length of CORESET/PDCCH are compared with a specific position and a specific length and when a predetermined condition (e.g., when the positions and the lengths are equal to or smaller than each other, when the positions and the lengths are similar to each other by a predetermined or less, etc.), it may be assumed that the scheduling is not pre-empted by another UE. In this case, the specific position, the specific length, and the predetermined condition may be predetermined or determined by higher layer signaling or L1 signaling of the gNB.

Method 5-2-2

It may be determined whether the UE is the pUE or the vUE based on the RNTI used when being scheduled with the resource.

As an example, it may be assumed that the scheduled resource received by the UE is not pre-empted by another UE through a specific RNTI.

In this case, the specific RNTI may be predetermined or determined by higher layer signaling or L1 signaling of the gNB.

Alternatively, the specific RNTI may be an identifier which the gNB allocates to the UE in order to schedule urgent traffic. Alternatively, the specific RNTI may be one of RNTIs which may be used in the URLLC transmission such as a CS-RNTI used in a configured grant, etc.

Method 5-3

When the UE receives the IRI, the UE may determine whether the UE is the pUE or the vUE by considering both the scheduling signal of the scheduled resource included in the pre-empted resource and the control signal used when receiving the IRI.

For example, mapping may exist between the control channel of the scheduling signal and/or the control channel of the control signal used for receiving the RNTI and the IRI and/or the RNTI used for reception and the corresponding scheduled resource may be pre-empted only with the mapped IRI.

The mapping may be predetermined by the configuration of the control channel and the type of RNTI or determined by higher layer signaling or L1 signaling of the gNB.

Figure 10:
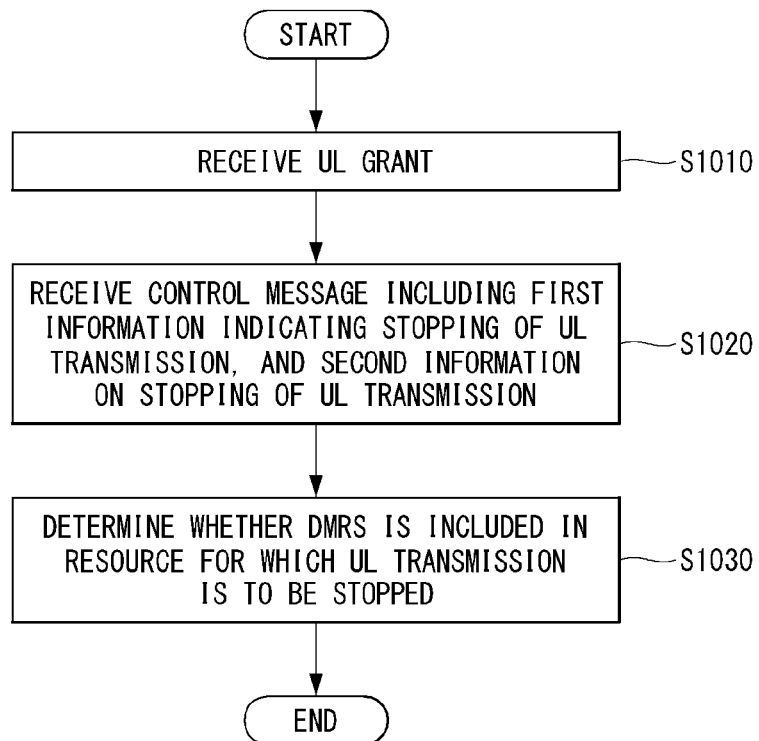
FIG. 10 illustrates an example of a flowchart for an operating method of a terminal for performing a method proposed in the present disclosure.

FIG. 10 illustrates an example of a flowchart for an operating method of a terminal for performing a method proposed in the present disclosure.

In other words, FIG. 10 illustrates an operation method, associated with uplink (UL) transmission, of a UE in a wireless communication system supporting dynamic resource sharing between an eMBB and a URLLC.

First, the UE receives, from a gNB, a UL grant for scheduling of the uplink transmission (S1010).

In addition, the UE receives, from the gNB, a control message including first information indicating the stopping of the uplink transmission and second information on a resource for which the UL transmission is to be stopped (S1020).

In addition, the UE determines whether a demodulation reference signal (DMRS) for the UL transmission is included in the resource for which the UL transmission is to be stopped based on the control message (S1030).

When the resource for which the uplink transmission is to be stopped is included in the DMRS, the UE may drop the uplink transmission in the resource for which the uplink transmission is to be stopped.

Alternatively, when the resource for which the uplink transmission is to be stopped is included in the DMRS, the UE may receive, from the gNB, information on a new location of the DMRS.

Here, a resource for the uplink transmission may include a first part corresponding to a resource positioned before the resource for which the uplink transmission is to be stopped, a second part corresponding to the resource for which the uplink transmission is to be stopped, and a third part corresponding to a resource behind the resource for which the uplink transmission is to be stopped.

Here, the information on the new location of the DMRS may be applied to each of the first part and the third part.

In addition, the resource for which the uplink transmission is to be stopped may be scheduled in units of a non-slot having a smaller than one slot in a time domain.

Figure 11:
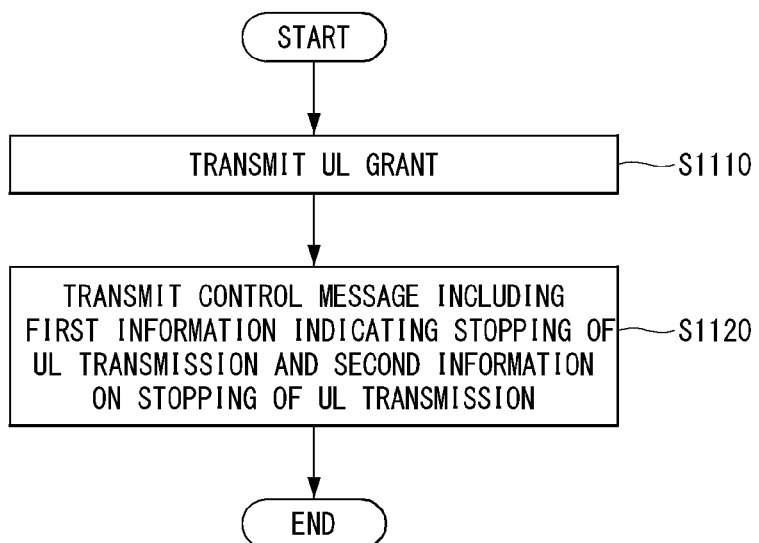
FIG. 11 illustrates an example of a flowchart for an operating method of a base station for performing a method proposed in the present disclosure.

FIG. 11 illustrates an example of a flowchart for an operating method of a base station for performing a method proposed in the present disclosure.

In other words, FIG. 11 illustrates an operation method, associated with uplink (UL) transmission, of a gNB in a wireless communication system supporting dynamic resource sharing between an eMBB and a URLLC.

First, the gNB transmits, to a UE, a UL grant for scheduling of the uplink transmission (S1110).

In addition, the gNB receives, to the UE, a control message including first information indicating the stopping of the uplink transmission and second information on a resource for which the UL transmission is to be stopped (S1120).

Alternatively, when the resource for which the uplink transmission is to be stopped is included in the DMRS, the gNB may transmit, to the UE, information on a new location of the DMRS.

A resource for the uplink transmission may include a first part corresponding to a resource positioned before the resource for which the uplink transmission is to be stopped, a second part corresponding to the resource for which the uplink transmission is to be stopped, and a third part corresponding to a resource behind the resource for which the uplink transmission is to be stopped.

The information on the new location of the DMRS may be applied to each of the first part and the third part.

Here, the resource for which the uplink transmission is to be stopped may be scheduled in units of a non-slot having a smaller than one slot in a time domain.

Overview of Devices to Which Present Disclosure is Applicable

Figure 12:
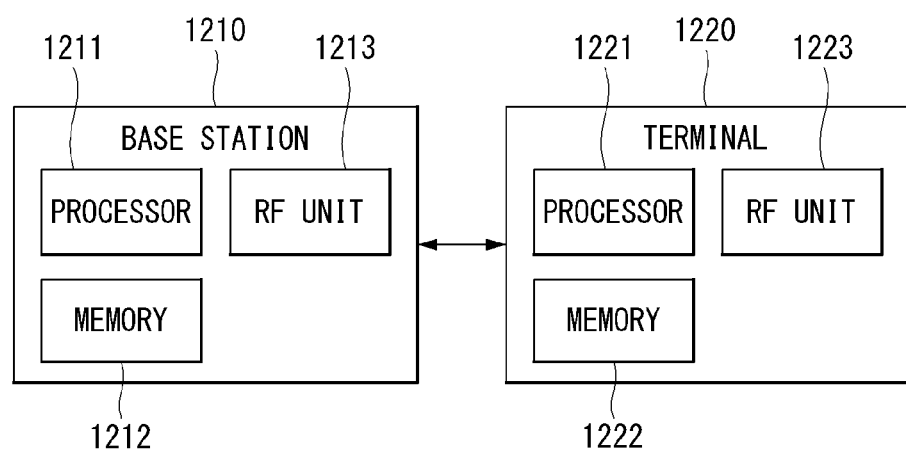
FIG. 12 illustrates an example of a block diagram of a wireless communication device to which methods proposed in the present disclosure may be applied.

FIG. 12 illustrates an example of a block diagram of a wireless communication device to which methods proposed in the present disclosure may be applied.

Referring to FIG. 12, a wireless communication system includes a gNB 1210 and multiple user equipments 1210 positioned within an area of the gNB.

Each of the gNB and the UE may be expressed as a wireless device.

The gNB includes a processor 1211, a memory 1212, and a radio frequency (RF) module 1213. The RF module may include a transmitter and a receiver. The processor 1211 implements a function, a process, and/or a method which are proposed in FIGS. 1 to 11 above. Layers of a radio interface protocol may be implemented by the processor. The memory is connected with the processor to store various information for driving the processor. The RF module is connected with the processor to transmit and/or receive a radio signal.

The UE includes a processor 1221, a memory 1222, and an RF module 1223.

The processor implements a function, a process, and/or a method which are proposed in FIGS. 1 to 11 above. Layers of a radio interface protocol may be implemented by the processor. The memory is connected with the processor to store various information for driving the processor. The RF module is connected with the processor to transmit and/or receive a radio signal.

The memories 1212 and 1222 may be positioned inside or outside the processors 1211 and 1221 and connected with the processor by various well-known means.

Further, the gNB and/or the UE may have a single antenna or multiple antennas.

The antennas 1214 and 1224 serve to transmit and receive the radio signals.

Figure 13:
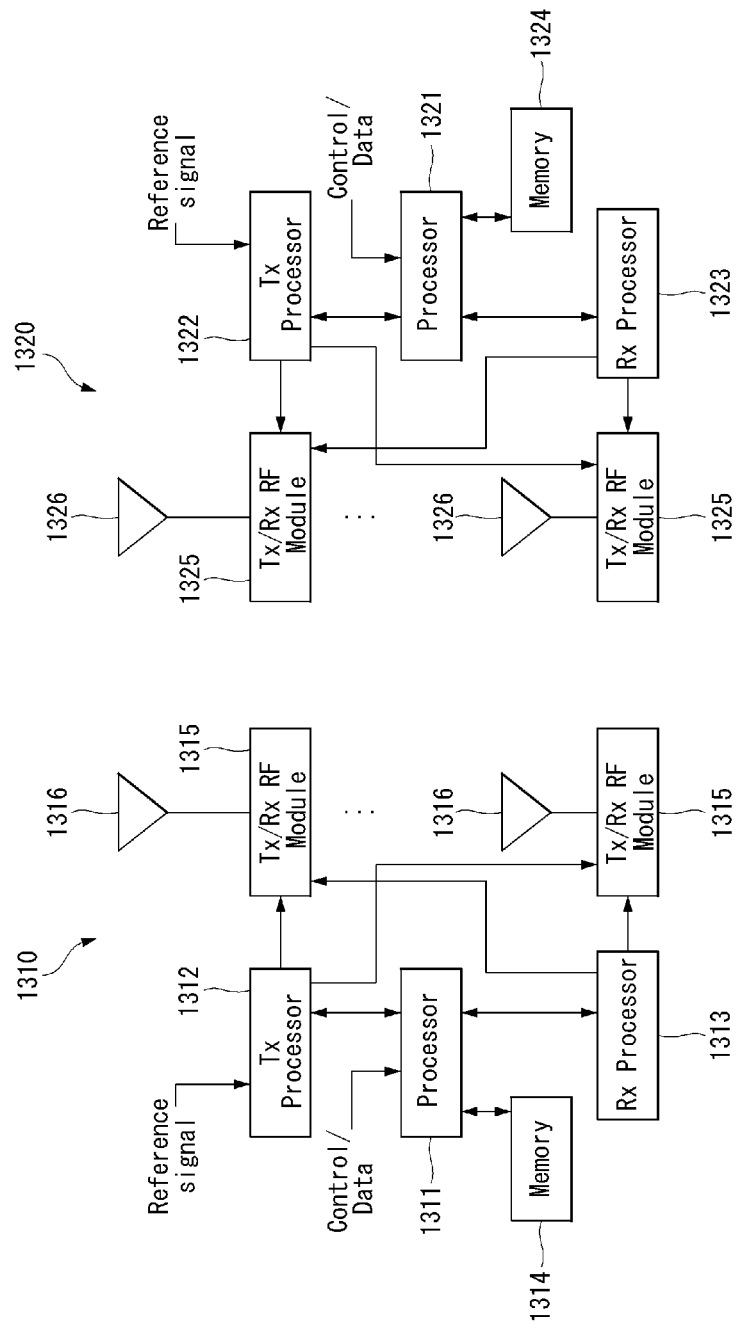
FIG. 13 illustrates another example of the block diagram of the wireless communication device to which the methods proposed in the present disclosure may be applied.

FIG. 13 illustrates another example of the block diagram of the wireless communication device to which the methods proposed in the present disclosure may be applied.

Referring to FIG. 13, a wireless communication system includes a gNB 1310 and multiple user equipments 1320 positioned within an area of the gNB. The gNB may be represented by a transmitting apparatus and the UE may be represented by a receiving apparatus, or vice versa. The gNB and the UE include processors 1311 and 1321, memories 1314 and 1324, one or more Tx/Rx radio frequency (RF) modules 1315 and 1325, Tx processors 1312 and 132, Rx processors 1313 and 1323, and antennas 1316 and 1326. The processor implements a function, a process, and/or a method which are described above. More specifically, a higher layer packet from a core network is provided to the processor 1311 in DL (communication from the gNB to the UE). The processor implements a function of an L2 layer. In the DL, the processor provides multiplexing between a logical channel and a transmission channel and allocation of radio resources to the UE 1320, and takes charge of signaling to the UE. The transmit (TX) processor 1312 implement various signal processing functions for an L1 layer (i.e., physical layer). The signal processing functions facilitate forward error correction (FEC) at the UE and include coding and interleaving. Encoded and modulated symbols are divided into parallel streams, each stream is mapped to an OFDM subcarrier, multiplexed with a reference signal (RS) in a time and/or frequency domain, and combined together by using inverse fast Fourier transform (IFFT) to create a physical channel carrying a time domain OFDMA symbol stream. An OFDM stream is spatially precoded in order to create multiple spatial streams. Respective spatial streams may be provided to different antennas 1316 via individual Tx/Rx modules (or transceivers, 1315). Each Tx/Rx module may modulate an RF carrier into each spatial stream for transmission. In the UE, each Tx/Rx module (or transceiver, 1325) receives a signal through each antenna 1326 of each Tx/Rx module. Each Tx/Rx module reconstructs information modulated with the RF carrier and provides the reconstructed information to the receive (RX) processor 1323. The RX processor implements various signal processing functions of layer 1. The RX processor may perform spatial processing on information in order to reconstruct an arbitrary spatial stream which is directed for the UE. When multiple spatial streams are directed to the UE, the multiple spatial streams may be combined into a single OFDMA symbol stream by multiple RX processors. The RX processor transforms the OFDMA symbol stream from the time domain to the frequency domain by using fast Fourier transform (FFT). A frequency domain signal includes individual OFDMA symbol streams for respective subcarriers of the OFDM signal. Symbols on the respective subcarriers and the reference signal are reconstructed and demodulated by determining most likely signal arrangement points transmitted by the gNB. The soft decisions may be based on channel estimation values. The soft decisions are decoded and deinterleaved to reconstruct data and control signals originally transmitted by the gNB on the physical channel. The corresponding data and control signals are provided to the processor 1321.

UL (communication from the UE to the base station) is processed by the gNB 1310 in a scheme similar to a scheme described in association with a receiver function in the UE 1320. Each Tx/Rx module 1325 receives the signal through each antenna 1326. Each Tx/Rx module provides the RF carrier and information to the RX processor 1323. The processor 1321 may be associated with the memory 1324 storing a program code and data. The memory may be referred to as a computer readable medium.

In the embodiments described above, the components and the features of the present disclosure are combined in a predetermined form. Each component or feature should be considered as an option unless otherwise expressly stated. Each component or feature may be implemented not to be associated with other components or features. Further, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

INDUSTRIAL APPLICABILITY

Although a scheme of performing uplink transmission in a wireless communication system of the present disclosure has been described with reference to an example applied to a 3GPP LTE/LTE-A system or a 5G system (New RAT system), the scheme may be applied to various wireless communication systems in addition to the 3GPP LTE/LTE-A system or 5G system.

The invention claimed is:

1. An operation method, associated with uplink (UL) transmission, of a terminal in a wireless communication system supporting dynamic resource sharing between an enhanced Mobile Broad Band (eMBB) and a ultra-reliable low-latency communications (URLLC), the method comprising:
receiving, from a base station, a UL grant for scheduling an uplink resource for the uplink transmission;
receiving, from the base station, downlink control information for indicating cancellation of the uplink transmission on the scheduled uplink resource; and
determining whether the downlink control information for indicating the cancellation of the uplink transmission on the scheduled uplink resource is valid, based on 1) a value of timing advance (TA) related with the terminal, and 2) a timing when the terminal receives the downlink control information for indicating the cancellation of the uplink transmission on the scheduled uplink resource,
wherein based on the downlink control information for indicating the cancellation of the uplink transmission on the scheduled uplink resource being valid, the uplink transmission on the scheduled uplink resource is canceled, and
wherein based on the downlink control information for indicating the cancellation of the uplink transmission on the scheduled uplink resource being invalid, the uplink transmission on the scheduled uplink resource is performed.

2. The method of claim 1, wherein whether the downlink control information for indicating the cancellation of the uplink transmission on the scheduled uplink resource is valid is determined further based on processing capability of the terminal for the uplink transmission.

3. The method of claim 2, further comprising:
determining whether a demodulation reference signal (DMRS) for the uplink transmission is included in the scheduled uplink resource, and
wherein the downlink control information includes information on a resource for which the uplink transmission is to be canceled.

4. The method of claim 3, wherein
based on the resource for which the uplink transmission is to be canceled being included in the DMRS, the resource for which the uplink transmission is to be canceled is canceled.

5. The method of claim 3, further comprising:
based on the resource for which the uplink transmission is to be canceled being included in the DMRS, receiving, from the base station, information on a new location of the DMRS.

6. The method of claim 5, wherein a resource for the uplink transmission includes a first part corresponding to a resource positioned before the resource for which the uplink transmission is to be canceled, a second part corresponding to the resource for which the uplink transmission is to be canceled, and a third part corresponding to a resource behind the resource for which the uplink transmission is to be canceled.

7. The method of claim 6, wherein the information on the new location of the DMRS is applied to each of the first part and the third part.

8. The method of claim 3, wherein the resource for which the uplink transmission is to be canceled is scheduled in units of a non-slot having a smaller than one slot in a time domain.

9. The method of claim 2, wherein based on that the scheduled uplink resource is before a timing which is after as much as a processing time based on the processing capability of the terminal for the uplink transmission from the timing when the terminal receives the downlink control information for indicating the cancellation of the uplink transmission on the scheduled uplink resource, the downlink control information for indicating the cancellation of the uplink transmission on the scheduled uplink resource is invalid.

10. The method of claim 9, wherein based on that the scheduled uplink resource is after a timing which is after as much as a processing time based on the processing capability of the terminal for the uplink transmission from the timing when the terminal receives the downlink control information for indicating the cancellation of the uplink transmission on the scheduled uplink resource, the downlink control information for indicating the cancellation of the uplink transmission on the scheduled uplink resource is valid.

11. A terminal for carrying out uplink (UL) transmission in a wireless communication system supporting dynamic resource sharing between an enhanced Mobile Broad Band (eMBB) and a ultra-reliable low-latency communications (URLLC), the terminal comprising:
 a transmitter for transmitting a radio signal;
 a receiver for receiving the radio signal; and
 a processor functionally connected to the transmitter and the receiver,
 wherein the processor is configured to control:
 the receiver to receive, from a base station, a UL grant for scheduling an uplink resource for the uplink transmission;
 the receiver to receive, from the base station, downlink control information for indicating cancellation of the uplink transmission on the scheduled uplink resource; and
 to determine whether the downlink control information for indicating the cancellation of the uplink transmission on the scheduled uplink resource is valid, based on 1) a value of timing advance (TA) related with the terminal, and 2) a timing when the terminal receives the downlink control information for indicating the cancellation of the uplink transmission on the scheduled uplink resource,
 wherein based on the downlink control information for indicating the cancellation of the uplink transmission on the scheduled uplink resource being valid, the uplink transmission on the scheduled uplink resource is canceled, and
 wherein based on the downlink control information for indicating the cancellation of the uplink transmission on the scheduled uplink resource being invalid, the uplink transmission on the scheduled uplink resource is performed.

12. The terminal of claim 11, wherein whether the downlink control information for indicating the cancellation of the uplink transmission on the scheduled uplink resource is valid is determined further based on processing capability of the terminal for the uplink transmission.

13. The terminal of claim 12, wherein the processor is further configured to control:
 determine whether a demodulation reference signal (DMRS) for the uplink transmission is included in the scheduled uplink resource, and
 wherein the downlink control information includes information on a resource for which the uplink transmission is to be canceled.

14. The terminal of claim 13, wherein based on the resource for which the uplink transmission is to be canceled being included in the DMRS, the resource for which the uplink transmission is to be canceled is canceled.

15. The terminal of claim 13, wherein the processor is further configured to control:
 based on the resource for which the uplink transmission is to be canceled being included in the DMRS, the receiver to receive, from the base station, information on a new location of the DMRS.

16. The terminal of claim 15, wherein a resource for the uplink transmission includes a first part corresponding to a resource positioned before the resource for which the uplink transmission is to be canceled, a second part corresponding to the resource for which the uplink transmission is to be canceled, and a third part corresponding to a resource behind the resource for which the uplink transmission is to be canceled.

17. The terminal of claim 16, wherein the information on the new location of the DMRS is applied to each of the first part and the third part.

18. The terminal of claim 13, wherein the resource for which the uplink transmission is to be canceled is scheduled in units of a non-slot having a smaller than one slot in a time domain.

* * * * *